(12) United States Patent
Murphy

(10) Patent No.: US 8,117,565 B2
(45) Date of Patent: Feb. 14, 2012

(54) DIGITAL IMAGE MAGNIFICATION FOR INTERNET APPLIANCE

(75) Inventor: Killian D. Murphy, San Francisco, CA (US)

(73) Assignee: Viaclix, Inc., Los Gatos, CA (US)

( * ) Notice: Subject to any disclaimer, the term of this patent is extended or adjusted under 35 U.S.C. 154(b) by 1675 days.

(21) Appl. No.: 10/033,520

(22) Filed: Oct. 18, 2001

(65) Prior Publication Data

US 2003/0076363 A1 Apr. 24, 2003

(51) Int. Cl.
*G06F 3/00* (2006.01)
(52) U.S. Cl. ........ 715/860; 715/764; 715/856; 715/866; 715/857; 715/858
(58) Field of Classification Search .................. 715/860, 715/764, 856, 866, 857, 858
See application file for complete search history.

(56) References Cited

U.S. PATENT DOCUMENTS

| 5,638,523 | A | * | 6/1997 | Mullet et al. ................. 715/855 |
| 5,696,530 | A | * | 12/1997 | Maejima ........................ 345/671 |
| 5,754,348 | A | * | 5/1998 | Soohoo ......................... 359/802 |
| 6,407,747 | B1 | * | 6/2002 | Chui et al. ..................... 345/660 |
| 6,704,034 | B1 | * | 3/2004 | Rodriguez et al. ............ 715/860 |

* cited by examiner

*Primary Examiner* — William Bashore
*Assistant Examiner* — Mylinh Tran
(74) *Attorney, Agent, or Firm* — Mark J. Danielson; Pillsbury Winthrop Shaw Pittman LLP

(57) ABSTRACT

A magnifying tool that enlarges a selected region of displayed image surrounding a cursor in a graphical user interface (GUI), and superimposes the enlarged region directly over the selected region (and a portion of the adjacent non-selected region). The location of the cursor relative to the enlarged region is co-located with the location of the cursor relative to the selected region such that the locations are identical.

18 Claims, 4 Drawing Sheets

DIGITAL IMAGE MAGNIFICATION FOR INTERNET APPLIANCE

FIELD OF THE INVENTION

This invention relates to graphical user interfaces. More particularly, the present invention relates to a method for dynamically magnifying a moveable selected region of a digital image within a graphical user interface.

BACKGROUND OF THE INVENTION

When viewing images displayed on a television screen by an Internet appliance, it is often desirable to view a portion of that image in a magnified format in order to discern small details that are lost by the typically poor resolution found on television screens. For example, Chinese characters often include small details such as lines separated by small distances that are impossible to discern at typical television screen resolution. To discern which character is displayed, the character must be magnified enough to discern these small details.

FIG. 1 depicts a first conventional magnification tool disclosed in U.S. Pat. No. 5,754,348 (Soohoo). Soohoo discloses a method for context-preserving magnification of selected digital image regions that allows simultaneous viewing of the magnified image and its unmagnified context (e.g., the unmagnified image surrounding the magnified image). The method provides a floating window 122 containing the magnified image that is superimposed on the original (unmagnified) background image. Floating window 122 is moved around the display screen using an input device (e.g., a mouse or trackball), and displays a magnified image of a selected region located under floating window 122 such that the magnified image within floating window 122 is superimposed over the selected region.

A problem with the magnification tool taught by Soohoo is that Soohoo fails to display a cursor or other pointing device in floating window 122, and fails to teach or suggest a method for selecting (clicking on) interface elements, e.g. a hyperlink, located in floating window 122. It would be desirable to have a method for using the pointing device interactively with interface elements shown in floating window 122. Additionally, reading horizontal text is difficult when the width of floating window 122 is less than the display screen width. It would be preferable to have a window extending the width of the display screen to maximize the horizontal area, thereby maximizing the readability of text appearing in the floating window.

FIG. 2 depicts another conventional magnification tool provided in Windows 2000 by Microsoft™ Corporation. A user interface 200 is divided into an upper portion 210 and a lower portion 220. Lower portion 220 displays an original (unmagnified) background image along with a cursor 230. Selected region 255 borders a portion of the original background image and is centered on cursor 230. Upper portion 210 displays a magnified version of a selected region 225 of the original background image surrounding cursor 230. Upper portion 210 additionally displays a magnified version (cursor 230E) of cursor 230, which is proportionally located with respect to the magnified version of selected region 225 displayed in upper portion 210.

A problem with the magnification tool shown in FIG. 2 is that although this magnification tool provides a magnified format for viewing small details of the original background image, it has the disadvantage that the context of the magnified image presented to the viewer is lost. Further, while a split screen display is suitable for high resolution computer monitors, the area occupied by such a split screen considerably reduces the available area on a television display, thereby making this magnification poorly suited for Internet appliances.

What is needed is a magnification tool that facilitates the interaction with interface elements, such as push buttons, text entry boxes, and hyperlinks, while minimizing the amount of required screen space and maintaining context, thereby optimizing the magnification tool for Internet appliances.

SUMMARY OF THE INVENTION

The present invention is directed to a magnification tool optimized for an Internet appliance in that it magnifies a selected region of an original background image, and inserts the magnified image between the original background image and a cursor such that the (unmagnified) cursor is displayed on the magnified image. The display area taken up by the magnified image is smaller than that of the original background image, thereby enabling the original background image to show around the top and/or bottom of the magnified image which maintains context between the magnified image and the original background image as the cursor is moved about the display screen. As the cursor is moved, the magnified image is changed such that a point located on the magnified image below the cursor matches a corresponding point located on the original background image (i.e., the cursor is co-located relative to corresponding points on both the normal-sized selected region of the original background image and the magnified image). Accordingly, when a user locates the cursor over an interface element, e.g. a magnified hyperlink, displayed in the magnified image, the cursor is also located over the same interface element in the original background image (which is covered by the magnified image), thereby facilitating convenient identification and selection of closely spaced or hard to read interface elements. An interface element is a portion of the graphical user interface (GUI) with which a user can interact. This magnified image is displayed as an overlay surface. An overlay surface is a picture that is not part of the original background image that is displayed on the display screen. The overlay surface, while being visible on the display screen, does not change the operation of a GUI with respect to the cursor and the original background image is not changed. As a result, the interface elements of the original background image under the cursor continue to respond to mouse clicks. In other words, the user appears to be mousing over and interacting with a magnified image because of the overlay of the magnified image in front of the original background image but behind the cursor. However, in reality, the mouse clicks are activating the interface elements in the original background image. Thus, the magnification tool of the present invention can be easily incorporated into the GUI with minimal disruption because the magnification tool simply inserts the magnified image between the cursor and the original background image.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

Figure 1:
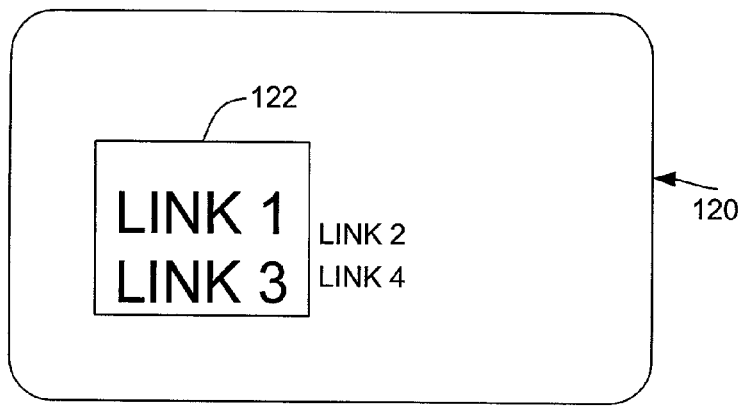
FIG. 1 is simplified screen display showing a first conventional magnification tool.
Figure 2:
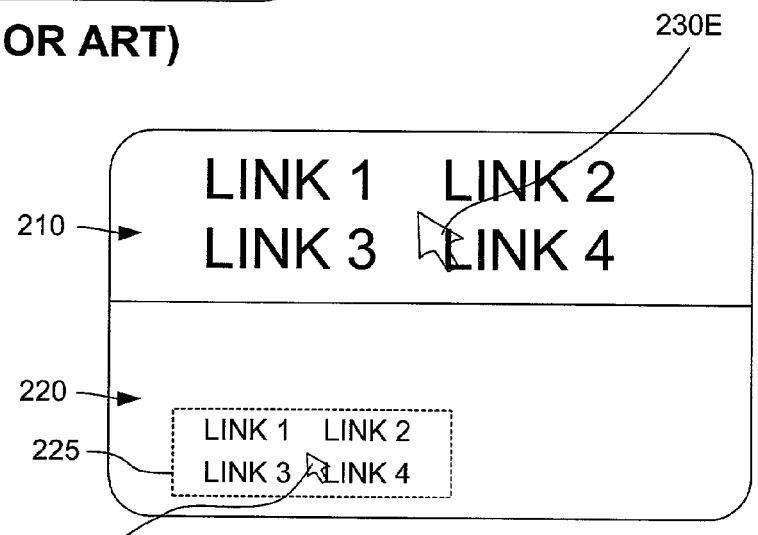
FIG. 2 is a simplified screen display showing another conventional magnification tool.
Figure 3:
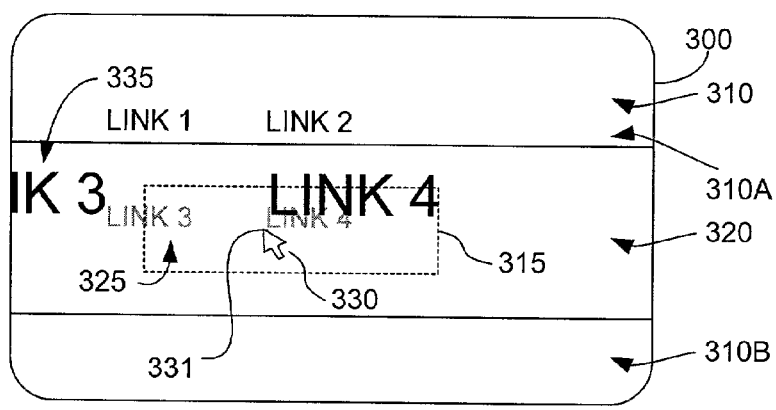
FIG. 3 is a simplified screen display showing a magnification tool according to an embodiment of the present invention.

FIG. 3 is a simplified screen display showing a magnifying tool for magnifying a portion of an image shown on a display 300. Shown on display 300 are an original (unmagnified) background image 310, which is generated from image data stored in the display buffer of a video memory in an Internet appliance (not shown), a magnified image 320, which is generated in accordance with the present invention and also stored in another portion of the video memory, and a cursor 330 that is position according to cursor position data also stored in the video memory. The Internet appliance can be a VIA250 produced by ViaClix, Inc. of Campbell, Calif.

As described in additional detail below, original background image 310, magnified image 320, and cursor 330 are superimposed over each other to form a composite image shown on display 300 according to known techniques. Original background image 310 includes "normal" (i.e., unmagnified) text 325 (or other indicia or graphics), which in the present example includes the text "LINK 1", "LINK 2", "LINK 3", and "LINK 4". Note that text "LINK 3" and "LINK 4" are masked by a portion of magnified image 320, which is indicated by shadow block type. In this embodiment, text "LINK 3" and "LINK 4" are not visible through magnified image 320 and are therefore shown in shadow block type only for clarity. Magnified image 320 includes enlarged (magnified) text 335 (i.e., a portion of text "LINK 3" and all of text "LINK 4") that is read from a portion of the image data associated with a selected region 315 of original background image 310. Note that the image data associated with selected region 315 is magnified using known techniques such that magnified image 320 covers the entire width of display 300, but only covers a fraction of the height of display 300 such that portions 310A and 310B of original background image 310 are shown above and/or below magnified image 320. Accordingly, the magnification tool allows a user to maintain the context of magnified image 320 relative to the position of the corresponding magnified text in original background image 310.

According to another aspect of the present invention, cursor position data, which is typically utilized by a GUI to position cursor 330 on display 300, is also used to determine the position and content of magnified image 320. Specifically, cursor 330 is positioned by a user via an input device (e.g., a mouse or trackball) to a desired cursor position 331. Cursor position data stored in the video memory of the Internet appliance indicates cursor position 331 at a given time. According to the present invention, the cursor position data indicating cursor position 331 is utilized to position according to the formulations provided below such that a point on magnified image 320 coincides with a point on original background image 310, which in turn coincides with cursor position 331. By modifying magnified image 320 such that the points coincide with cursor position 331, a user is able to utilize the magnification tool of the present invention to precisely position cursor 330 over selected regions of original background image 310 that they are enlarged (magnified) for easy identification. As a result, if selected region 315 includes interface elements such as hyperlinks, then those interface elements are visible to be selected (clicked upon) within magnified region 320. These features are explained further below.

Figure 4:
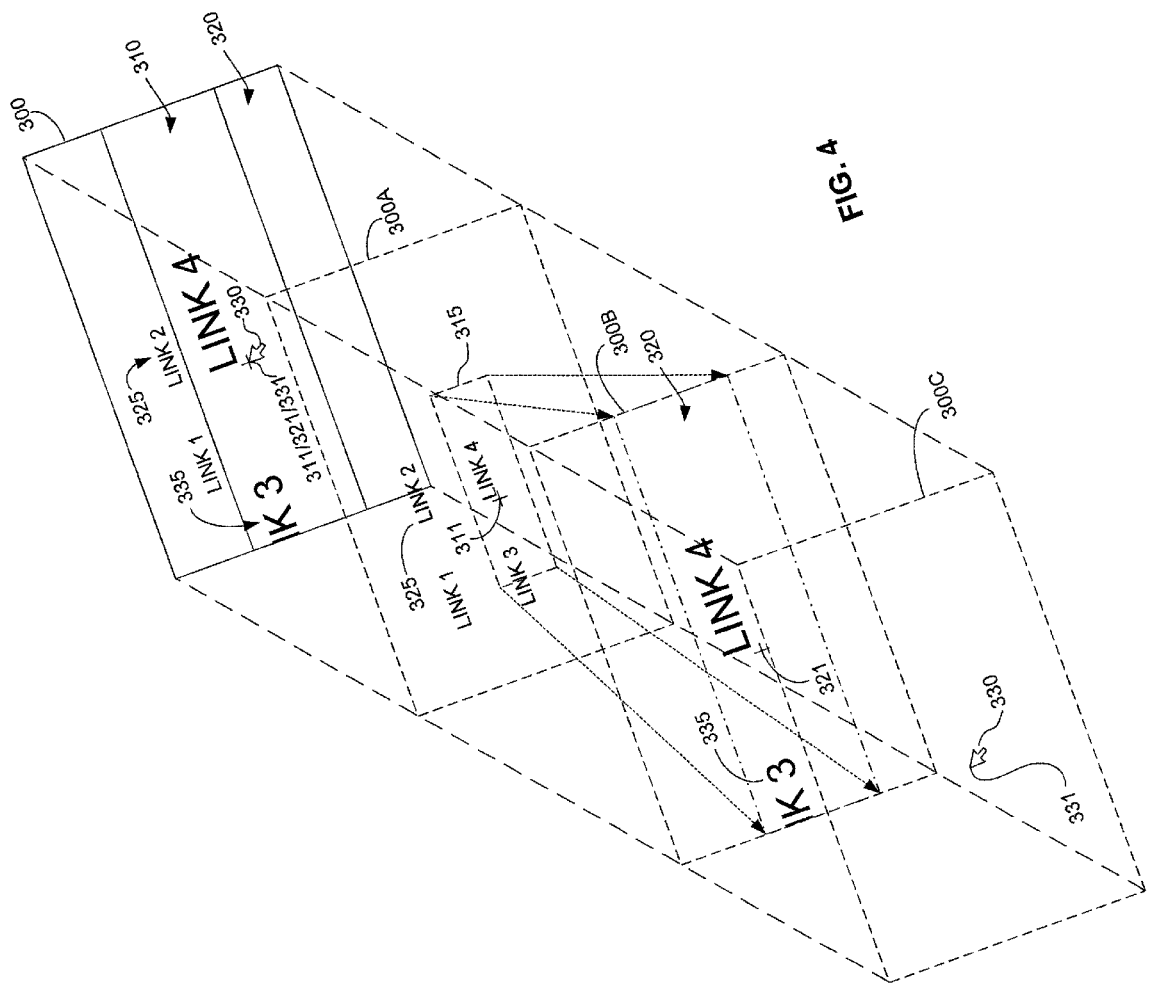
FIG. 4 is an exploded diagram showing successive layers of images (screens) that are superimposed to form the magnification screen display tool shown in FIG. 3.

FIG. 4 is an exploded diagram depicting the individual layers 300A, 300B, and 300C that are superimposed to form the composite image shown on display 300. Original background image layer 300A depicts original background image 310, which is generated from image data stored in the display buffer of the video memory. As discussed above, original background image 310 includes unmagnified text 325 and selected region 315, which is determined by a point 311 that corresponds with cursor position 331 (shown in layer 300C). The dashed line surrounding a portion of original background image 310 is shown for reference only, and is not visible on display 300 as shown. Overlay surface layer 300B includes magnified image 320, whose content and vertical position are determined by a point 321, which corresponds with cursor position 331 (shown in layer 300C). Specifically, the position of selected region 315 is determined using the formulas discussed below, and image data corresponding to the portion of original background image 310 surrounded by selected region 315 is magnified to form magnified image 320. The contents of overlay surface layer 300B are generated from a portion of the video memory other than the display buffer. Overlay surface layer 300B is superimposed onto original background image layer 300A such that portions of original background image 310 located "under" magnified image 320 are masked. Finally, cursor layer 300C, which includes cursor 330 located at cursor position 331, is superimposed on top of magnified image 320. Display 300 therefore displays layers 300A-300C, where points 311, 321, and cursor location 331 are co-located.

In one embodiment, magnified region 320 is defined as a block transfer (BLT) from the data displayed within selected region 315. Thus, selected region 315 is duplicated exactly into the overlay surface portion of the video memory, having the same shape and size. During display of the overlay surface, a transformation is performed to expand the duplicated portion of selected region 315 such that magnified region 320 is generated on display 300. One such transformation is described below with respect to FIG. 5. As described above, magnified region 320 is positioned on top of original background image 310 in such a way that the point of magnified region 320 appearing under the cursor at cursor position 331 corresponds to the point of original background image 310 at cursor position 331. Although the magnified region overlay surface is visible on the display, it is the interface elements within the original background image 310 that respond to mouse clicks. Thus, original background image 310 and cursor 330 operate as if magnified region 320 were not superimposed therebetween. Accordingly, the magnification tool of the present invention is easily incorporated into existing GUI's with minimal disruption in the operation of a host Internet appliance.

In another embodiment, magnified region 320 is defined as an expanded transfer (called a stretch BLT) from the data displayed at selected region 315. Thus, selected region 315 is duplicated and transformed into the overlay surface portion of the video memory. The transformation is such that the rendering of magnified region 320 is stored in the video memory, making the region stored in the overlay surface portion of the video memory larger than that of selected region 315. During display, the overlay surface is displayed directly as magnified region 320 on display 300 without further transformation.

Figure 5:
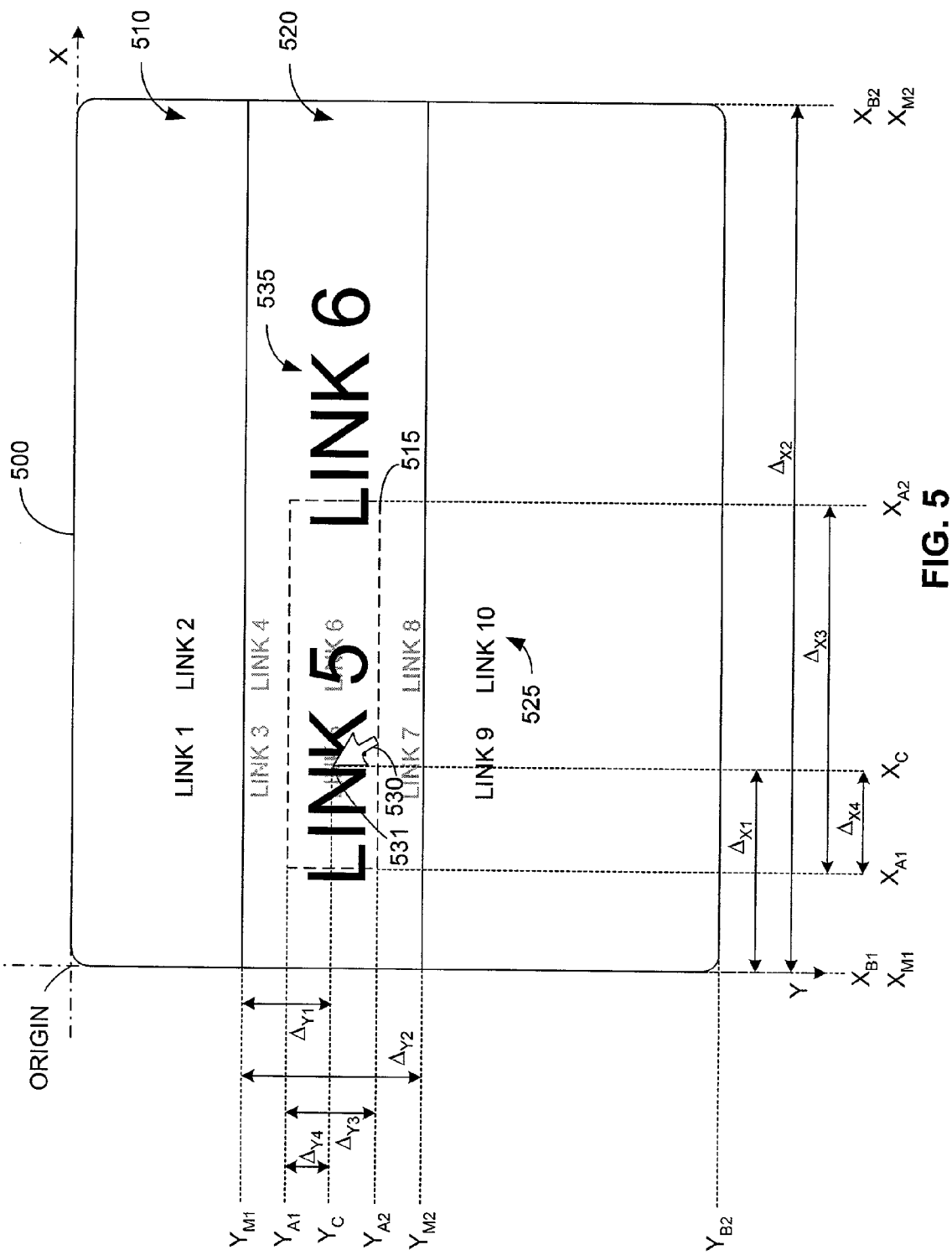
FIG. 5 is a simplified screen display showing the position of the magnified image relative to the cursor in the magnification tool according to a specific embodiment of the present invention.

FIG. 5 is a diagram of a display 500 according to an embodiment of the present invention. Display 500 depicts an original background image 510. Display 500 has a coordinate reference system defining the origin at the upper left portion of the display such that the X axis extends along the top of display 500, increasing in value towards the right hand side of the display, and the Y axis extends along the left hand side of display 500, increasing in value towards the bottom of the display. Original background image 510 contains unmagnified text 525. Magnified image 520 is displayed on top of original background image 510 and contains magnified text 535.

Magnified image 520 extends the width of display 500 to maximize readability of magnified text. Other embodiments extend magnified image 520 only to the edge of the safe display region of a television set to further increase readability on some displays. A safe display region is that portion of a display that is guaranteed to be visible. Magnified image 520 contains the magnified contents of selected region 515. The size of selected region 515 is determined by both the relative position of cursor 530 to the edges of original background image 510 and the amount of magnification desired.

Cursor 530 is positioned with an X axis value equal to $X_C$ and a Y axis value equal to $Y_C$. That is, cursor 530 points at the coordinate $(X_C, Y_C)$. The position of cursor 530 $(X_C, Y_C)$ is a known value, e.g. cursor position 331 of FIG. 4. Original background image 510 is positioned at the origin. That is, original background image 510 has a left-most upper point at (0, 0). Original background image 510 extends the width of display 500 to an X axis value of $X_{B2}$ and the height of display 500 to a Y axis value of $Y_{B2}$. Thus, the width of original background image 510 is equal to $X_{B2}$, and the height of original background image 510 is equal to $Y_{B2}$. The width $X_{B2}$ and height $Y_{B2}$ of original background image 510 are known values.

As shown in FIG. 5, selected region 515 extends from $(X_{A1}, Y_{A1})$ to $(X_{A2}, Y_{A2})$. Thus, the width of selected region 515 is equal to $X_{A2}-X_{A1}$, or $\Delta_{X3}$, and the height of selected region 515 is equal to $Y_{A2}-Y_{A1}$, or $\Delta_{Y3}$. Similarly, magnified image 520 extends from $(X_{M1}, Y_{M1})$ to $(X_{M2}, Y_{M2})$. In one embodiment, $X_{M1}$ and $X_{M2}$, are located at the edges of display 500, 0 and $X_{B2}$, respectively. The width of magnified image 520 is equal to $X_{M2}-X_{M1}$, or $\Delta_{X2}$, and the height of magnified image 520 is equal to $Y_{M2}-Y_{M1}$, or $\Delta_{Y2}$. The width $\Delta_{X2}$ and height $\Delta_{Y2}$ of magnified image 520 are known values. The magnification level is the amount of increase in size of the contents of selected region 515 and is also a known value, determined prior to display of magnified image 520. Thus, the width $\Delta_{X2}$ of magnified region 520 is equal to the magnification level multiplied the width $\Delta_{X3}$ of selected region 515 and the height $\Delta_{Y2}$ of magnified region 520 is equal to the magnification level multiplied the height $\Delta_{Y3}$ of selected region 515. Therefore, the height and width, $\Delta_{X3}$ and $\Delta_{Y3}$, respectively, of selected region 515 are known.

With respect to the display coordinate system, magnified image 520 is positioned with an X axis value equal to the left-most edge of original background image 510, or $X_{M1}=X_{B1}$. As previously mentioned, the height of overlay surface 520 is equal to $\Delta_{Y2}$. The height of magnified image 520 is centered around cursor position 531 of cursor 530. Therefore, magnified image 520 has a upper left corner Y axis value $Y_{M1}$ equal to the Y axis value of the cursor less half the height of magnified image 520, or $Y_C-0.5*\Delta_{Y2}$. As a result, magnified image 520 has a left-most upper point at $(X_{M1}, Y_{M1})=(X_{B1}, Y_C-0.5*\Delta_{Y2})$.

To determine the X axis location $(X_{A1})$ of selected region 515, the relative position of the cursor $(X_C)$ with respect to the X axis value of the left-most portion of selected region 515 $(X_{A1})$ is determined. In other words, the X axis value of the left-most portion of selected region 515, $X_{A1}$, is equal to the X axis value of cursor 530 $(X_C)$ less the distance between the X axis value of the cursor $(X_C)$ and the left-most portion of selected region 515 $(X_{A1})$, or $\Delta_{X4}$. Therefore:

$$X_{A1}=X_C-\Delta_{X4} \qquad \text{Equation 1.}$$

The relative position of cursor 530 to the contents of selected region 515 is equal to the relative position of cursor 530 to the contents of magnified image 520. Thus, the relative position of cursor 530 with respect to the X axis value of the left-most portion of selected region 515 $(\Delta_{X4})$ to the width of selected region 515 $(\Delta_{X3})$ is equal to the relative position of cursor 530 with respect to the X axis value of the left-most portion of magnified region 520 $(\Delta_{X1})$ to the width of magnified region 520 $(\Delta_{X2})$. In other words:

$$\frac{\Delta_{X4}}{\Delta_{X3}} = \frac{\Delta_{X1}}{\Delta_{X2}}. \qquad \text{Equation 2}$$

Solving for $\Delta_{X4}$:

$$\Delta_{X4} = \frac{\Delta_{X1}}{\Delta_{X2}}\Delta_{X3}. \qquad \text{Equation 3}$$

Because $\Delta_{X1}$ is equal to the relative position of the cursor $(X_C)$ with respect to the X axis value of the left-most portion of magnified region 520 $(X_{M1})$, or $\Delta_{X1}=X_C-X_{M1}$, Equation 3 becomes:

$$\Delta_{X4} = \frac{(X_C - X_{M1})\Delta_{X3}}{\Delta_{X2}}. \qquad \text{Equation 4}$$

As a result, combining Equation 1 with Equation 4 results in the X axis value of the left-most portion of selected region 515 as:

$$X_{A1} = X_C - \frac{(X_C - X_{M1})\Delta_{X3}}{\Delta_{X2}}. \qquad \text{Equation 5}$$

To determine the Y axis location $(Y_{A1})$ of selected region 515, the relative position of cursor 530 $(X_C)$ with respect to the Y axis value of the upper-most portion of selected region 515 $(Y_{A1})$ is determined. In other words, the Y axis value of the upper-most portion of selected region 515, $Y_{A1}$, is equal to the Y axis value of cursor 530 $(Y_C)$ less the distance between the Y axis value of the cursor $(Y_C)$ and the upper most-portion of selected region 515 $(Y_{A1})$, or $\Delta_{Y4}$. Therefore:

$$Y_{A1}=Y_C-\Delta_{Y4} \qquad \text{Equation 6.}$$

The relative position of cursor 530 to the contents of selected region 515 is equal to the relative position of cursor 530 to the contents of magnified image 520. Thus, the relative position of cursor 530 with respect to the Y axis value of the upper-most portion of selected region 515 $(\Delta_{Y4})$ to the height of selected region 515 ($\Delta_{Y3}$) is equal to the relative position of cursor 530 with respect to the Y axis value of the upper-most portion of magnified region 520 ($\Delta_{Y1}$) to the height of magnified region 520 ($\Delta_{Y2}$). In other words:

$$\frac{\Delta_{Y4}}{\Delta_{Y3}} = \frac{\Delta_{Y1}}{\Delta_{Y2}}. \qquad \text{Equation 7}$$

Solving for $\Delta_{Y4}$:

$$\Delta_{Y4} = \frac{\Delta_{Y1}}{\Delta_{Y2}}\Delta_{Y3}. \qquad \text{Equation 8}$$

Because $\Delta_{Y1}$ is equal to the relative position of the cursor ($Y_C$) with respect to the Y axis value of the upper-most portion of selected region 515 ($Y_{B1}$), Equation 3 becomes:

$$\Delta_{Y4} = \frac{(Y_C - Y_{M1})\Delta_{Y3}}{\Delta_{Y2}}. \qquad \text{Equation 9}$$

As a result, combining Equation 6 with Equation 9 results in the Y axis value of the bottom-most portion of selected region 515 as:

$$Y_{A1} = Y_C - \frac{(Y_C - Y_{M1})\Delta_{Y3}}{\Delta_{Y2}}. \qquad \text{Equation 10}$$

Therefore, selected region 515 has a left-most upper-most point at $$(X_{A1}, Y_{A1}) = \left(X_C - \frac{(X_C - X_{M1})\Delta_{X3}}{\Delta_{X2}}, Y_C - \frac{(Y_C - Y_{M1})\Delta_{Y3}}{\Delta_{Y2}}\right).$$

Figure 6A:
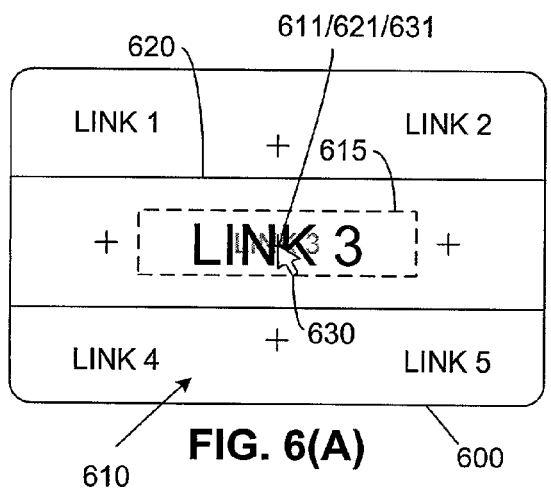
FIGS. 6(A)-6(D) are simplified screen display showing relative positioning between the magnified and original background images as the cursor is moved.
Figure 6B:
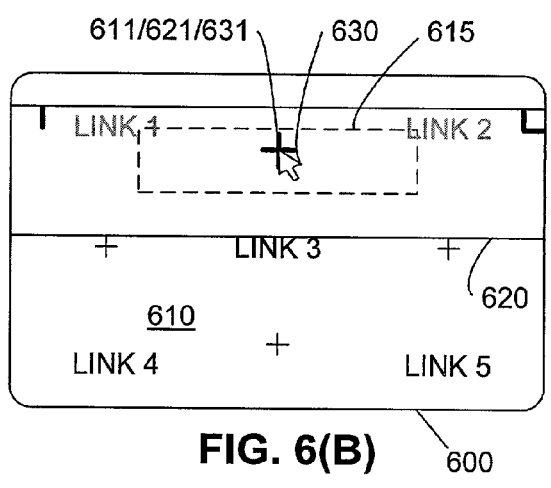
Figure 6C:
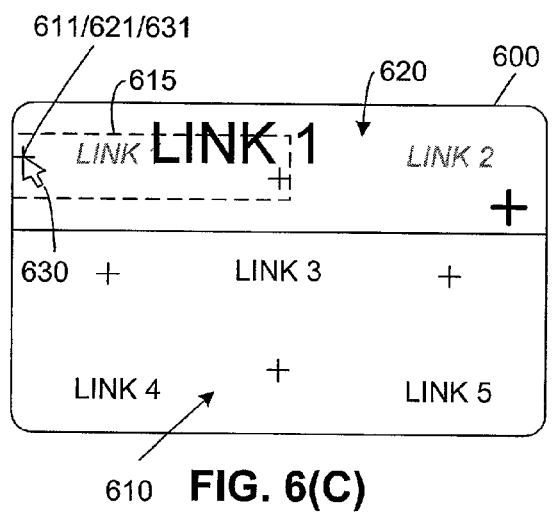
Figure 6D:
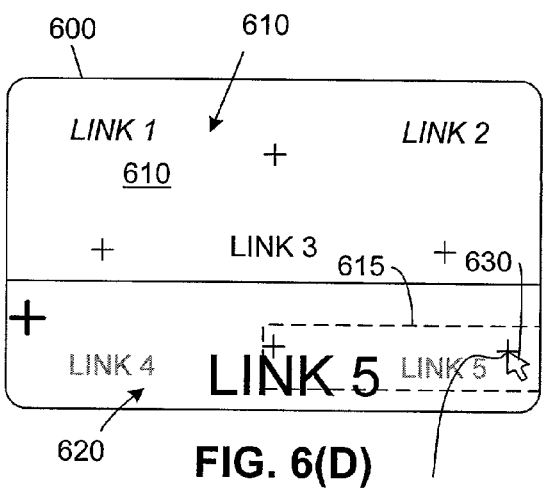

FIGS. 6(A) through 6(D) are simplified display screens showing the relationship between movements of a cursor 630 on a display 600 and those of magnified region 620 according to the equations described above. As indicated in FIG. 6(A), when cursor 630 is located in the center of display 600, points 611 and 621 and cursor position 631 (which respectively correspond to points 311, 321 and cursor position 331 of the embodiment shown in FIG. 4) are also located in the center of selected region 615. Accordingly, both selected region 615 and magnified image 620 are centered on display 600. As shown in FIG. 6(B), when cursor 630 is moved up from this centered position, magnified region 620 also moves up, thereby magnifying a different portion of the original background image. Note that the upward movement of cursor 630 causes cursor position 631 and points 611 and 621 to move upward within selected region 615. Referring to FIG. 6(C), moving cursor 630 horizontally to the left from the position shown in FIG. 6(B) causes selected region 615 to move left, thereby changing the content of magnified image 620. However, because there is no vertical component to the position change of cursor 630, the position of magnified region 620 remains in the same relative to display 600. Note again that the leftward movement of cursor 630 causes cursor position 631 and points 611 and 621 to move leftward within selected region 615. Finally, moving cursor 620 to the lower right from the position of FIG. 6(C) results in the magnified region 620 moving to the lower right portion of display 600 and magnifying a portion of display 600 down and to the right of that portion displayed in FIG. 6(C). Again note that cursor position 631 and points 611 and 621 have moved to the lower right corner of selected region 615 in response to this cursor movement.

Although the present invention has been described with respect to certain specific embodiments, it will be clear to those skilled in the art that the inventive features of the present invention are applicable to other embodiments as well, all of which are intended to fall within the scope of the present invention. For example, in one embodiment, the unmagnified text obscured by the magnified region may be displayed in some fashion (e.g. alpha blending) through the magnified region to further enhance context.

The invention claimed is:

1. A method of digital image magnification in a graphical user interface (GUI) on a display, the method comprising:
   identifying a selected region of a first image adjacent to a cursor in the GUI, wherein the selected region has a predetermined height and width that is independent of a position of the cursor in the GUI;
   forming a magnified image including an enlarged version of the first image located in the selected region;
   superimposing the magnified image over the first image such that the magnified image masks the selected region;
   superimposing the cursor over the magnified image to form a second image; and
   utilizing cursor position data stored in a display buffer of a video memory indicating the cursor position in the GUI such that positioning of a second point in the second image corresponding to the superimposed cursor relative to the magnified image coincides with a first point corresponding to the cursor in the GUI relative to the first image, wherein the magnified image is rendered on the display using data stored in a portion of the video memory different from the display buffer, while the display buffer continues to store data for the first image;
   wherein identifying the selected region comprises: determining Cartesian coordinate data identifying a location of the cursor; and calculating upper and left boundaries of the selected region based on the Cartesian coordinate data;
   wherein calculating the left boundary comprises multiplying a distance from the cursor to a left boundary of the magnified image by the width of the selected region to form a first factor; dividing the first factor by a width of the magnified image to form a second factor; and subtracting the second factor from an X Cartesian coordinate of the cursor; wherein calculating the upper boundary comprises: multiplying a distance from the cursor to an upper boundary of the magnified image by the height of the selected region to form a third factor; dividing the third factor by a height of the magnified image to form a fourth factor; and subtracting the fourth factor from a Y Cartesian coordinate of the cursor.

2. The method according to claim 1, wherein the magnified image has a width equal to a width of the GUI, thereby enhancing the readability of text in the first image.

3. The method according to claim 1, wherein a location identified by the cursor relative to the magnified image is co-located with a location identified by the cursor relative to the first image.

4. The method according to claim 3, wherein a user visually interacting with a magnified interface element at the location identified by the cursor relative to the magnified image actually interacts with an interface element at the location identified by the cursor relative to the first image.

5. The method of claim 1, wherein the second image is displayed within a television safe area on a display screen.

6. The method of claim 1, further comprising alpha blending the first image with the magnified image, such that the first image shows through the magnified image.

7. A method of digital image magnification in a graphical user interface (GUI) on a display, the GUI including a first image and a cursor superimposed over the first image and movable on the first image by manipulation of an input device, the method comprising:
determining Cartesian coordinate data identifying a first point on the first image located under the cursor;
forming a magnified image including an enlarged version of a selected region surrounding the identified first point;
superimposing the magnified image over the first image;
superimposing the cursor over the magnified image; and
utilizing the determined Cartesian coordinate data stored in a display buffer of a video memory such that positioning of a second point in the second image corresponding to the superimposed cursor relative to the magnified image coincides with the identified first point relative to the first image, wherein the magnified image is rendered using data stored in a portion of the video memory different from the display buffer, while the display buffer continues to store data for the first image;
wherein identifying the selected region comprises: determining Cartesian coordinate data identifying a location of the cursor; and calculating upper and left boundaries of the selected region based on the Cartesian coordinate data;
wherein calculating the left boundary comprises multiplying a distance from the cursor to a left boundary of the magnified image by the width of the selected region to form a first factor; dividing the first factor by a width of the magnified image to form a second factor; and subtracting the second factor from an X Cartesian coordinate of the cursor; wherein calculating the upper boundary comprises: multiplying a distance from the cursor to an upper boundary of the magnified image by the height of the selected region to form a third factor; dividing the third factor by a height of the magnified image to form a fourth factor; and subtracting the fourth factor from a Y Cartesian coordinate of the cursor.

8. The method of claim 7, wherein the magnified image is superimposed over the first image such that a first edge of the magnified image extends to a first edge of the first image and a second edge of the magnified image extends to a second edge of the first image.

9. The method of claim 7, wherein the magnified image, first image, and the cursor are displayed within a television safe area on a display screen.

10. The method according to claim 7, wherein a user visually interacting with a magnified interface element at the second point actually interacts with an interface element at first point.

11. A method of magnifying a portion of a background image in a graphical user interface (GUI), the GUI including image data for generating the background image on a display, and cursor position data for positioning a cursor over the background image, the method comprising:
identifying a first selected point of the background image that coincides with the cursor position data;
forming a magnified image using the image data corresponding to a selected region located adjacent to the first selected point, wherein the magnified image includes a second selected point that coincides with the first selected point; and
superimposing the magnified image between the background image and the cursor such that the cursor masks a portion of the magnified image; and
utilizing the cursor position data stored in a display buffer such that positioning of the second selected point corresponding to the superimposed cursor relative to the magnified image coincides with the first selected point relative to the background image, wherein the magnified image is rendered using data stored in a portion of a video memory different from the display buffer, while the display buffer continues to store data for the background image;
wherein identifying the selected region comprises: determining Cartesian coordinate data identifying a location of the cursor; and calculating upper and left boundaries of the selected region based on the Cartesian coordinate data;
wherein calculating the left boundary comprises multiplying a distance from the cursor to a left boundary of the magnified image by the width of the selected region to form a first factor; dividing the first factor by a width of the magnified image to form a second factor; and subtracting the second factor from an X Cartesian coordinate of the cursor; wherein calculating the upper boundary comprises: multiplying a distance from the cursor to an upper boundary of the magnified image by the height of the selected region to form a third factor; dividing the third factor by a height of the magnified image to form a fourth factor; and subtracting the fourth factor from a Y Cartesian coordinate of the cursor.

12. The method of claim 11, wherein the magnified image is superimposed between the background image and the cursor such that a first edge of the magnified image extends to a first edge of the background image and a second edge of the magnified image extends to a second edge of the background image.

13. The method of claim 11, wherein the magnified image, background image, and the cursor are displayed within a television safe area on a display screen.

14. The method according to claim 11, wherein a user visually interacting with a magnified interface element at the second selected point actually interacts with an interface element at first selected point.

15. A system included in an internet appliance for magnifying an image on a display device coupled to the internet appliance, the system comprising:
means for identifying a selected region of a first image adjacent to a cursor in the GUI; means for forming a magnified image including an enlarged version of the first image located in the selected region;
means for superimposing the magnified image over the first image such that the magnified image masks the selected region;
means for superimposing the cursor over the magnified image to form a second image such that the cursor masks a portion of the magnified image; and
means for utilizing cursor position data stored in a display buffer indicating the cursor position in the GUI such that positioning of a second point in the second image corresponding to the superimposed cursor relative to the magnified image coincides with a first point corresponding to the cursor in the GUI relative to the first image, wherein the magnified image is rendered using data stored in a portion of a video memory different from the display buffer, while the display buffer continues to store data for the first image;
wherein identifying the selected region comprises: determining Cartesian coordinate data identifying a location of the cursor; and calculating upper and left boundaries of the selected region based on the Cartesian coordinate data;
wherein calculating the left boundary comprises multiplying a distance from the cursor to a left boundary of the magnified image by the width of the selected region to form a first factor; dividing the first factor by a width of the magnified image to form a second factor; and subtracting the second factor from an X Cartesian coordinate of the cursor; wherein calculating the upper boundary comprises multiplying a distance from the cursor to an upper boundary of the magnified image by the height of the selected region to form a third factor; dividing the third factor by a height of the magnified image to form a fourth factor; and subtracting the fourth factor from a Y Cartesian coordinate of the cursor.

16. The system according to claim 15, wherein the magnified image has a width equal to a width of the first image, thereby enhancing the readability of text in the first image.

17. The system according to claim 15, wherein a location identified by the cursor relative to the magnified image is co-located with a location identified by the cursor relative to the first image.

18. The system according to claim 15, wherein a user visually interacting with a magnified interface element at the location identified by the cursor relative to the magnified image actually interacts with an interface element at the location identified by the cursor relative to the first image.

* * * * *